United States Patent
Boss et al.

(10) Patent No.: US 7,559,033 B2
(45) Date of Patent: Jul. 7, 2009

(54) METHOD AND SYSTEM FOR IMPROVING SELECTION CAPABILITY FOR USER INTERFACE

(75) Inventors: Gregory J. Boss, American Fork, UT (US); Yen-Fu Chen, Austin, TX (US); Rick A. Hamilton, II, Charlottesville, VA (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 11/186,533

(22) Filed: Jul. 21, 2005

(65) Prior Publication Data

US 2007/0022386 A1    Jan. 25, 2007

(51) Int. Cl.
*G06F 3/048* (2006.01)

(52) U.S. Cl. .................................. 715/769; 715/770

(58) Field of Classification Search ............ 715/769, 715/770, 764
See application file for complete search history.

(56) References Cited

U.S. PATENT DOCUMENTS

| 5,625,809 | A  | * | 4/1997  | Dysart et al. ........... 707/103 R |
| 5,982,370 | A  |   | 11/1999 | Kamper .................. 345/356 |
| 6,177,939 | B1 | * | 1/2001  | Blish et al. ............. 715/770 |
| 6,499,138 | B1 |   | 12/2002 | Swix et al. ............. 725/38 |
| 6,564,186 | B1 |   | 5/2003  | Kiraly et al. ........... 704/260 |
| 6,986,105 | B2 | * | 1/2006  | Walker, Jr. ............. 715/531 |
| 2004/0230907 | A1 | * | 11/2004 | Yang .................... 715/530 |
| 2006/0075353 | A1 | * | 4/2006  | DeSpain et al. .......... 715/770 |

FOREIGN PATENT DOCUMENTS

WO    WO02/03187 A2    1/2002

OTHER PUBLICATIONS

Microsoft Corporation, Microsoft Office Word 2003, 2003, Microsoft Corporation, attached screen shots MSWord Figs. 1-7.*
Novick et al., "Extending Direct Manipulation in a Text Editor," Dept. Of Computer Science, University of Texas (2002).
Jacob, "A Specification Language for Direct-Manipulation User Interfaces," *ACM Transactions on Graphics*, vol. 5, No. 4, pp. 283-317 (1986).
Goldberg et al., "Stylus User Interfaces for Manipulating Text," Symposium on User Interface Software and Technology, *Proceedings of the 4th Annual ACM Symposium on User Interface Software and Technology*, pp. 127-135 (1991).

* cited by examiner

*Primary Examiner*—Dennis Bonshock
(74) *Attorney, Agent, or Firm*—John Pivnichny; Saul Ewing LLP

(57) ABSTRACT

In a graphical user interface or other similar processing environment, functionality is provided that enables the selecting of multiple portions of non-contiguous content, and enables such functionality within the same application and also across different applications. Further, a "direct save" function is enabled that allows the user to directly save the multiple portions of selected content to a file. In addition, selected content portions can be categorized, and a mechanism is provided to allow the user to conveniently make use of these various categories for effective content viewing.

4 Claims, 8 Drawing Sheets

METHOD AND SYSTEM FOR IMPROVING SELECTION CAPABILITY FOR USER INTERFACE

BACKGROUND OF THE INVENTION

1. Field of the Invention

This invention relates to the field of content management in a computer environment and, more particularly, to the manipulation, control, and management of text content.

2. Description of the Related Art

Computers, PDA's, and other similar processing devices enable users to manipulate, control, and manage content of all kinds. Probably the most common form of content used on such devices is text content. Word processors and text editors (referred to generically as "editors" herein) allow text to be cut, pasted, modified, and saved quickly and easily.

Text selection capabilities are a fundamental feature of almost every editor, especially for applications that run on the Microsoft Windows operating system. Text is typically selected for editing purposes, such as cutting; cutting and pasting; changing font characteristics; copying; and other similar operations. The display of the selected text on the display screen is typically altered in some manner to differentiate it from the non-selected text, e.g., by changing the background color and/or font color of the selected text (often referred to as "highlighting"), by underlining the selected text, by changing the selected text from normal to bold, etc.

In a typical application, to select text the user simply positions a mouse pointer at a selection point using a mouse or other pointing device, and then performs one of several actions to select a desired portion of the text. For example, double-clicking on a particular word selects the entire word; triple-clicking on a word will select the entire sentence containing that word, and quadruple-clicking on a word selects the entire paragraph containing the word. Alternatively, holding down the right mouse button and "dragging" the mouse pointer down a page will cause all lines of text over which the mouse pointer is dragged, up to the stopping point, to be selected. Some users prefer using the "Control" and "Shift" keys (or other similar key combinations, depending upon the features of the program being used), in combination with the function keys "up, down, end, home" in order to select a complete line, paragraph, or entire content.

Prior art editors can only select one continuous portion of text at a time. In other words, they "lose track" of the first selection of selected text when a different portion of the text is selected for highlighting. This holds true whether the second selection is in the same document (e.g., in a single Microsoft Word document) or in a different application (e.g., the first selection of text is in an MS Word document and the second selection of text is in a Corel WordPerfect document). There is no "multiple selecting" function that is capable of spanning non-contiguous parts of a single application or multiple applications.

Some editors do allow for a "batch copy" function through the manual method of selecting one section of text and copying it to a "clipboard," then selecting the next desired text and appending it to the existing clipboard text, and repeating this process until all desired data has been copied and appended. The entire contents of the clipboard can then be pasted to a single location using the pasting function of the program. This is a tedious process.

What is needed is a set of comprehensive selecting features that reduce the numerous manual steps currently required of text-editing programs.

SUMMARY OF THE INVENTION

In a graphical user interface or other similar processing environment, functionality is provided that enables the selecting of multiple portions of non-contiguous content, and enables such functionality within the same application and also across different applications. Further, a "direct save" function is enabled that allows the user to directly save the multiple portions of selected content to a file. In addition, selected content portions can be categorized, and a mechanism is provided to allow the user to conveniently make use of these various categories for effective content viewing.

DETAILED DESCRIPTION OF THE PREFERRED EMBODIMENTS

Figure 1:
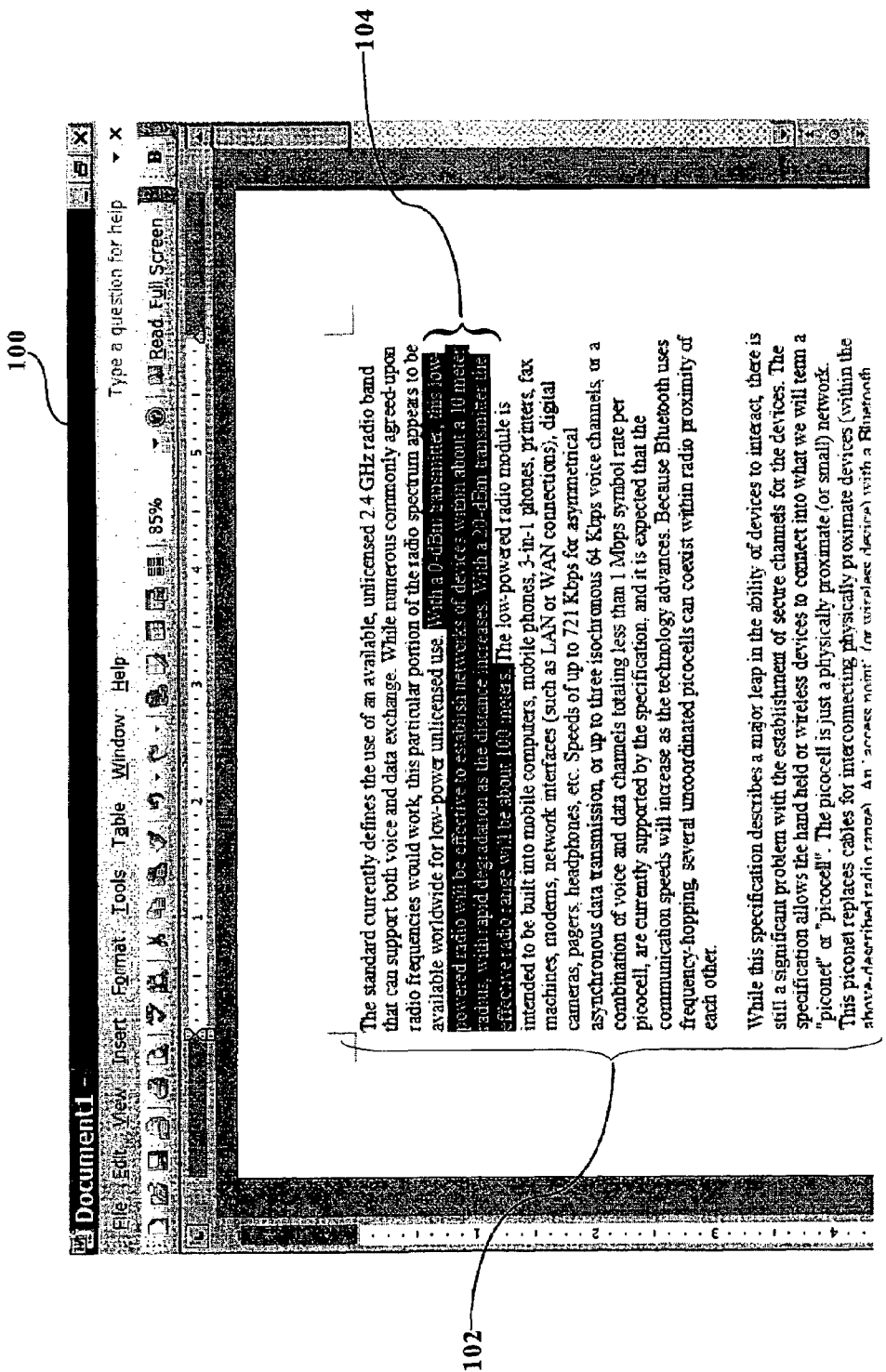
FIGS. 1-3 illustrate various screen captures showing how a typical text selection capability functions.
Figure 2:
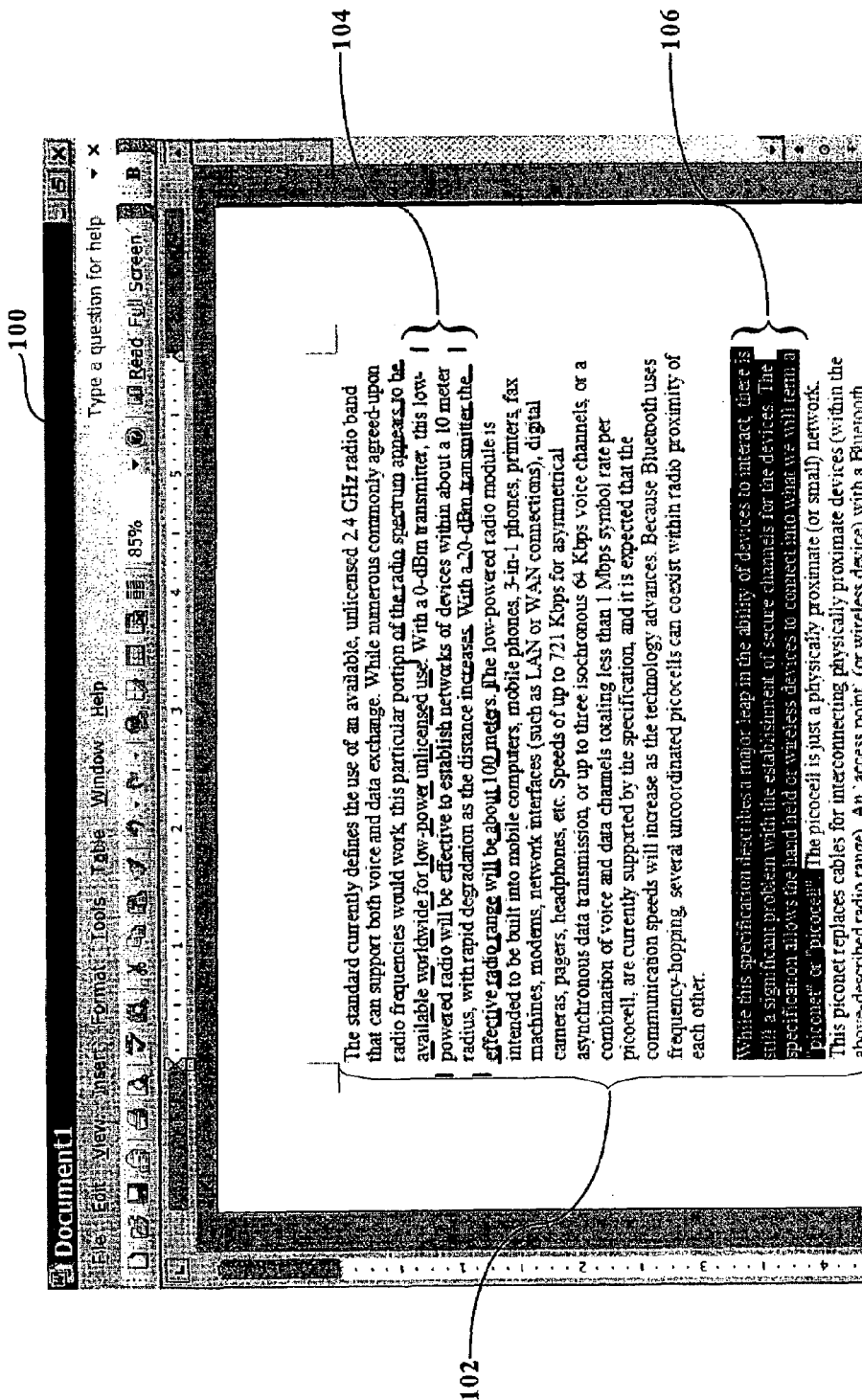
Figure 3:
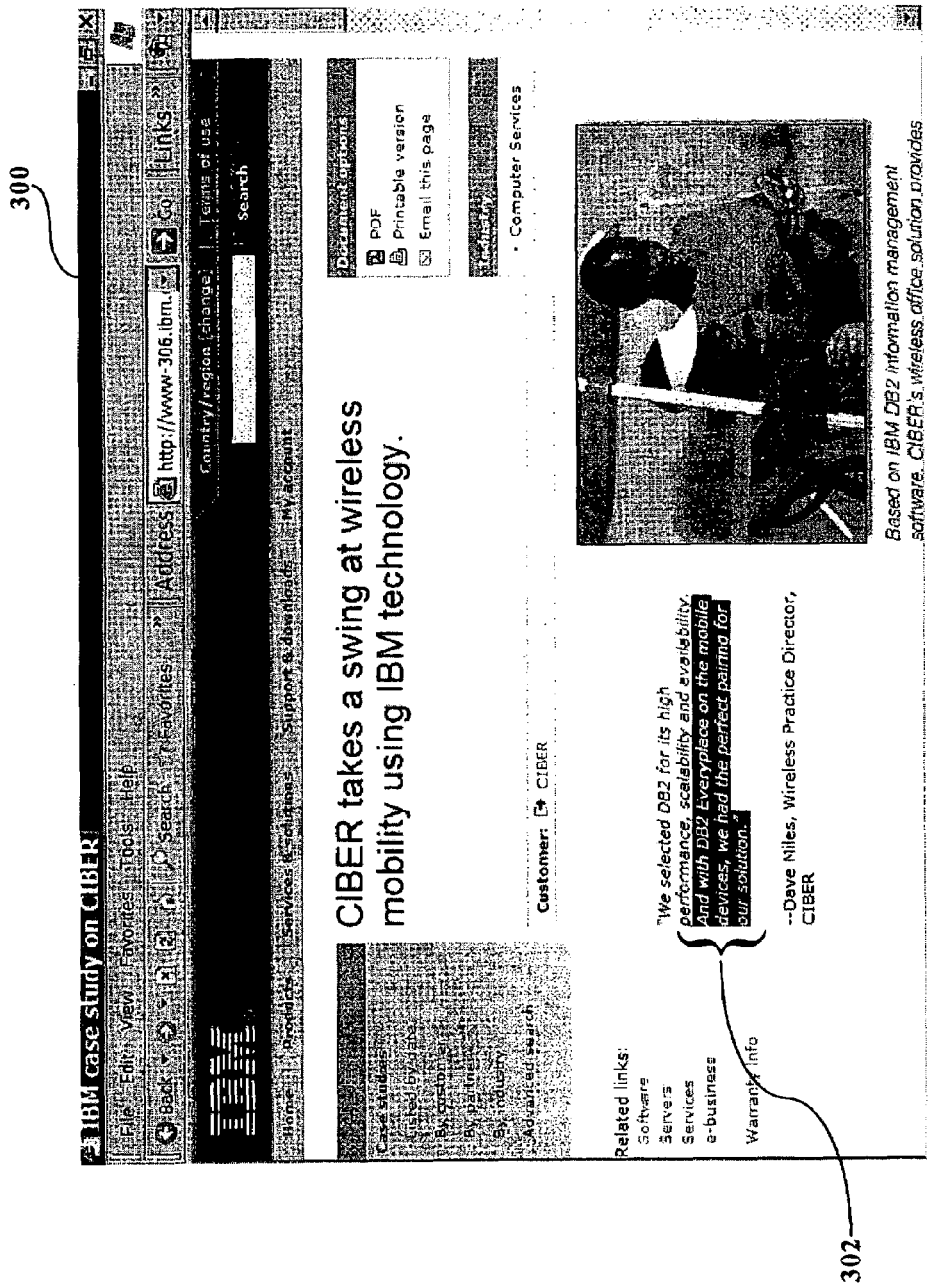

FIGS. 1-3 illustrate various screen captures showing how a typical text selection capability functions. The examples herein are directed to the selection of text content; however, it is understood that the present invention can be utilized with any type of selectable content, e.g., images, binaries, etc.

FIGS. 1 and 2 are screen captures of the same document in a word processing environment. In FIG. 1, text 102 is displayed in a graphical user interface (GUI) environment 100. A text portion 104 has been selected using any known manner, for example, right-clicking on the text and dragging the mouse over the text or using well known keyboard functions. The selected text is displayed as highlighted text in this example.

FIG. 2 illustrates what happens when, using the prior art, a user tries to select a different section of text 106 lower on the page. As can be seen, the text portion 104 that was selected in FIG. 1 (shown surrounded by dotted lines) is now back to normal (non-highlighted) text and the newly-selected text portion 106 is now highlighted.

FIG. 3 illustrates text selection in a web environment. Referring to FIG. 3, if the user minimizes the word processing GUI 100 of FIGS. 1 and 2 and opens a web browser 300, and wishes to select text portion 302 therein, the text selected on the web page will be highlighted (in this example)as shown, but the selected text portion 106 from the word processing document (FIG. 2) will no longer be highlighted. In other words, the prior art systems allow a single section of text to be selected at a time, whether in the same window or in a different window.

Figure 4:
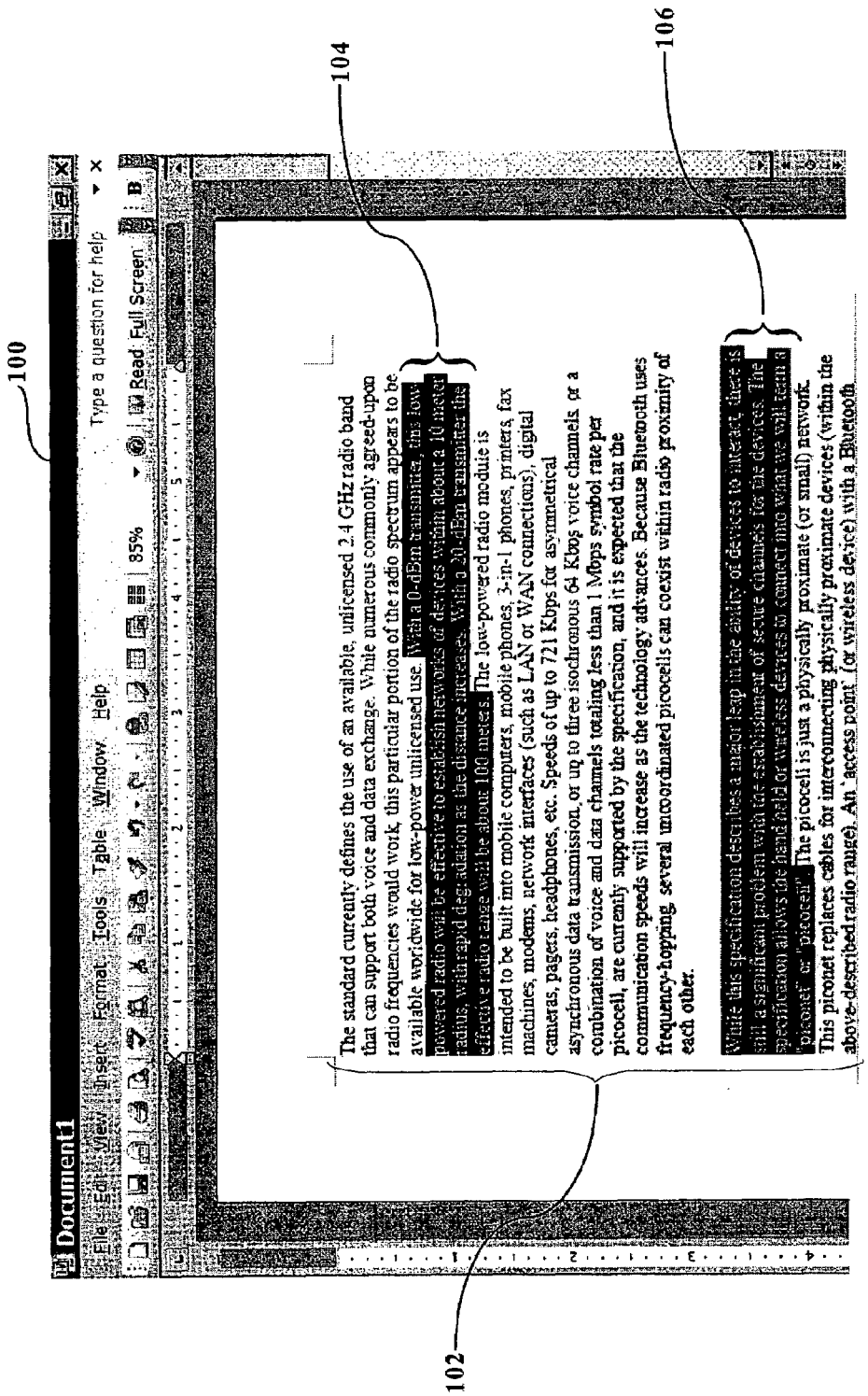
FIG. 4 illustrates the multiple-block selection functionality of the present invention.
Figure 5:
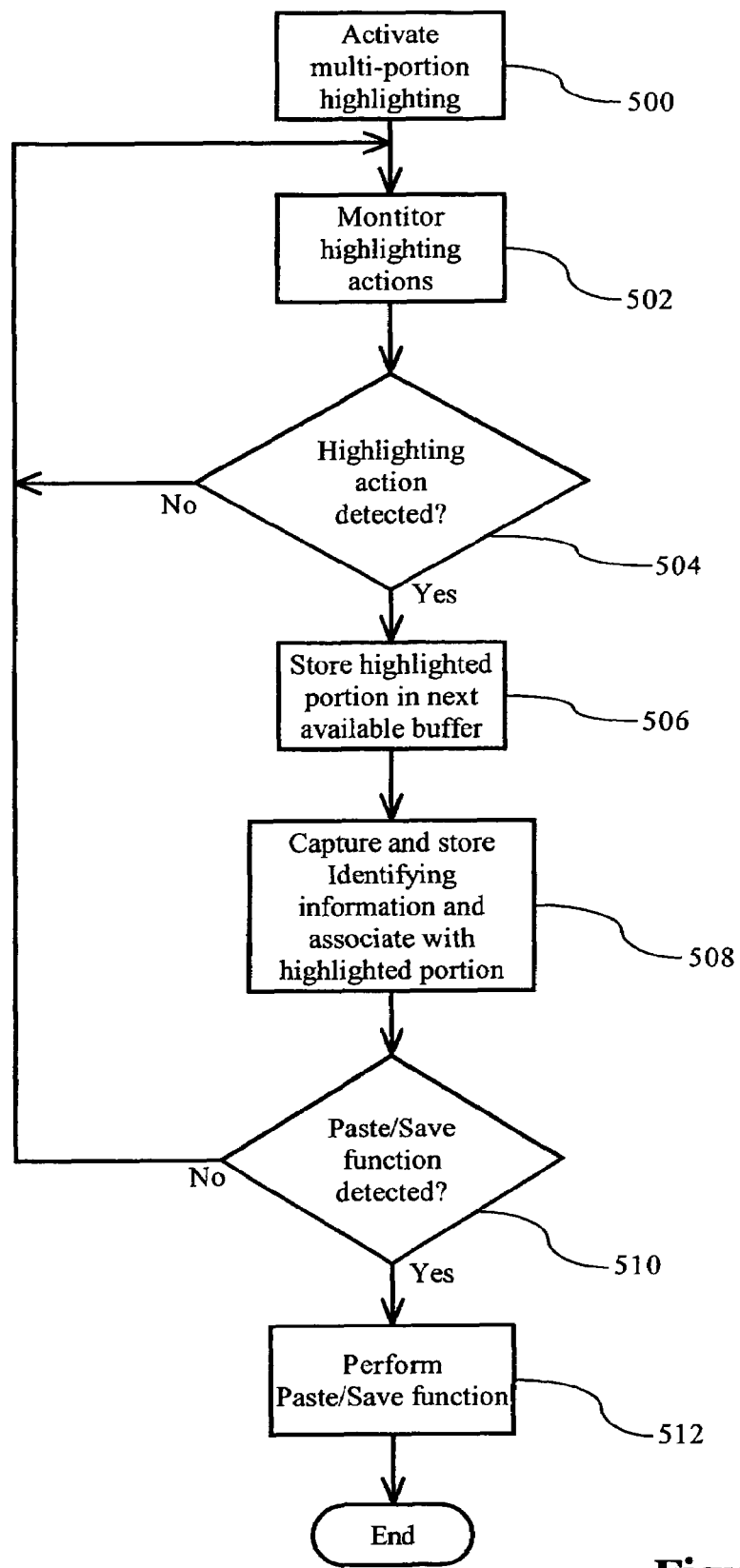
FIG. 5 illustrates process steps that can be implemented to perform the multi-block selection function of the present invention.

FIG. 4 illustrates the multiple-portion selection ability of the present invention, and FIG. 5 is a flowchart illustrating process steps that can be implemented to perform the multi-portion selection function. As can be seen in FIG. 4, two non-contiguous portions of the document displayed in the screen capture of FIG. 4 (text portions 104 and 106) have been simultaneously selected.

The steps illustrated in FIG. 5 can be implemented to perform the multi-portion select function of the present invention. Referring to FIG. 5, at step 502, the multi-portion select functionality is activated. This can be done in one of many ways, e.g., by clicking on a "toggle button" in a GUI to toggle between the multi-portion selection mode and "regular" selection mode. The exact manner of performing the activation function is a matter of design choice and numerous methods of providing the activation function will be apparent to a designer of ordinary skill in the art.

At step 504, with the multi-portion selection function activated, the system is monitored for the occurrence of activity indicating that text is being selected. For example, processor activity can be monitored for activity identifying the start and end points of a selection function, e.g., the pressing and holding of the left mouse button coupled with movement of the mouse (a starting point) followed by the release of the left mouse button (an end point), or the user initiating the copy function using the Ctrl-C keystroke combination. If selection activity is not detected at step 506, the process reverts back to step 504 to continue monitoring for selection activity. If, however, at step 506 selection activity is detected, then the process proceeds to step 508.

At step 508, the text that has been selected is automatically captured and stored in a buffer (step 510). For example, a series of sequentially numbered buffers can be provided for storage of the selected text, and as text is selected, it can stored in the next available buffer. In addition to storing the selected text, the system also captures and stores information identifying the source of the selected portion (e.g, path, filename, name of program that the text is associated with, etc) and stores this information in the same buffer so that the identifying information is associated with the appropriate text portion. As is well known, programing languages and word-processing documents include built-in objects enabling the identification/tracking of attributes that identify the filename of documents and position information of text within the documents. Numerous other techniques for identifying information about the filename and location of text within a file are known and can be used to identify the text portions.

If desired, the captured and stored portions, along with their identifying information, can be automatically pasted to an intermediate viewer such as the "selection viewer" described below in connection with FIG. 6.

At step 512, a determination is made as to whether or not a "terminating action" such as a paste or save function has been detected. This will typically occur after the user has finished selecting multiple portions of text and is ready to take a group action on the selected text (e.g., paste it all into a single location and/or save it all into a single file). If no paste/save (or other similar terminating action) is detected, then the process proceeds back to step 504 to continue monitoring for new selection activity. If, at step 512, a terminating function is detected, then terminating action (e.g., paste, save, etc.) is performed (step 514), and the process ends.

Thus, using the process described above, a user of the system and method of the preset invention can, within the same document, or in a different document within the same program, or in a completely different document in a different program, continue to add portions of non-contiguous text or other content to the series of selected portions, and each will remain selected after a new selection is made. This provides multiple dimensions such that the user is able to select text in an application such as Notepad or Lotus WordPro, and then switch to another application, such as an email program, select text within both, and retain the selected sections so that the user can both see the selected text and act upon the plurality of selected text portions with a single action.

Figure 6:
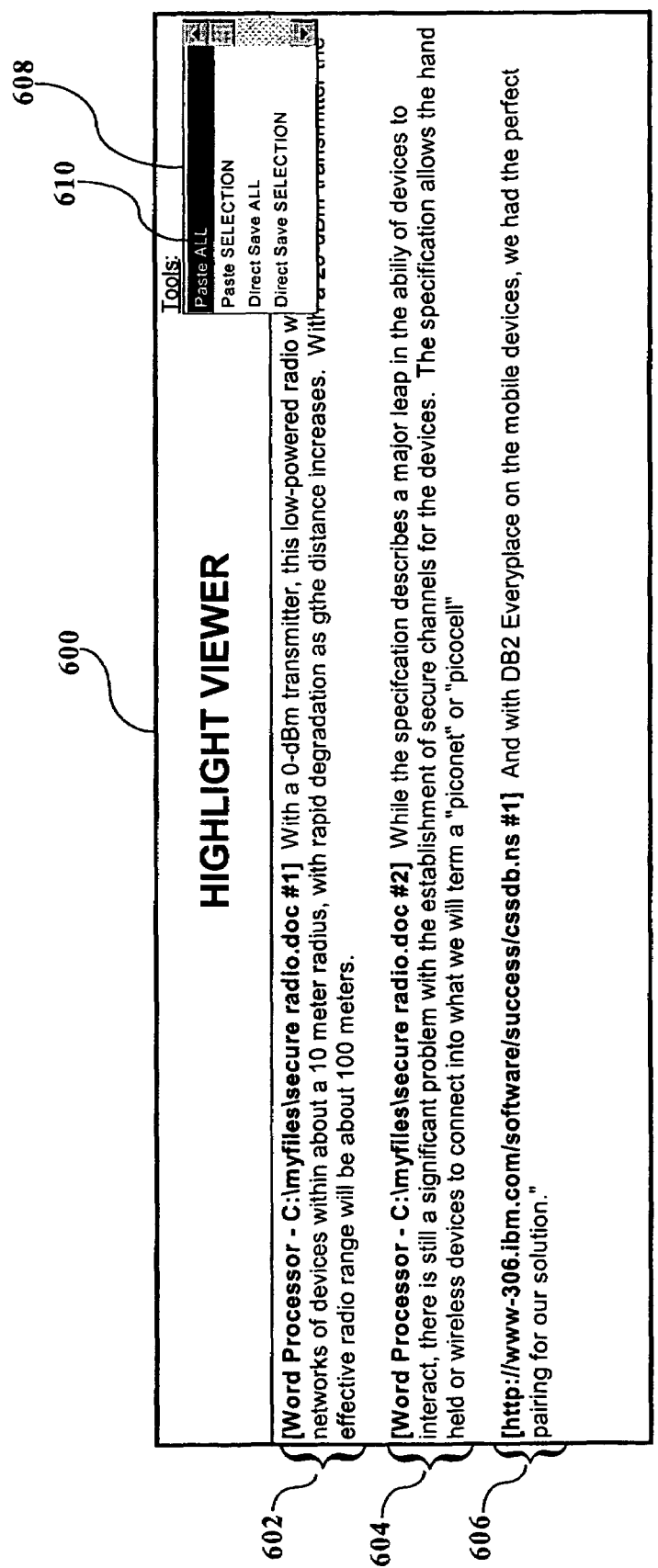
FIG. 6 illustrates an intermediate "selection viewer" in accordance with the present invention.

In a preferred embodiment of the present invention, a user can perform a "quick view" or "selection view" function which will allow the user to view the current set of selected text blocks from a single location, such as the "selection text viewer" 600 illustrated in FIG. 6. This selection view can be activated using any known method, e.g., a right click or control function, via a drop-down menu or tool bar, etc. As can be seen in FIG. 6, the selection viewer 600 displays the selected text portions, and, in front of each selected text portion, an identification of where the text came from. For example, in FIG. 6, the first text block 602 has an indication that it is a word processing document stored at the location C:/myfiles/secureradio.doc and the designation "#1" indicates that it is the first text block selected from this document. As can be seen, a second text block 604 selected from the same document is illustrated immediately below block 602. Finally, a third block of text 606 is selected from a website, www-306.ibm.com/software/success/cssdb.ns, and is designated with the #1 designation to indicate it is the first text clip selected from that web page.

In accordance with the present invention, multiple save buffers can be used, or even a simple event driven program, to allow users to copy text from each application and display the text in a selection viewer such as that of FIG. 6. This happens by automatically recording/storing the selected text and source information of the text into a temporary storage area such as the above-described sequential buffers, and when the user performs a paste function, in accordance with the present invention, all of the text copied into the temporary storage area will be included in the single paste function. Thus, for example, the user can be provided with a "paste all" selection 610 from a drop-down menu 608 and, with a single paste action, insert all of the text shown in FIG. 6 into another location of a document.

In a preferred embodiment, the user can also be presented with a "direct save" function. The direct save function is also illustrated in FIG. 6. As shown in FIG. 6, drop-down menu 608 includes "direct save ALL" and "direct save SELECTION" options which give the user the option of saving all or portions of the selected text immediately to a directory location. If desired, when selecting either of the direct save functions, an additional menu (not shown) can be provided listing possible save locations. A preset list of save locations can be displayed, or some of the more recent save locations (e.g., the last 3, the last 10, etc) can be displayed. Any other manner of designating the save location, including the use of a write-in area to allow the user to write in the desired save location, can be utilized. The menu 608 can also be configured to give the user the ability to copy all of the selected text or paste portions of the selected text, with a single click.

Figure 7:
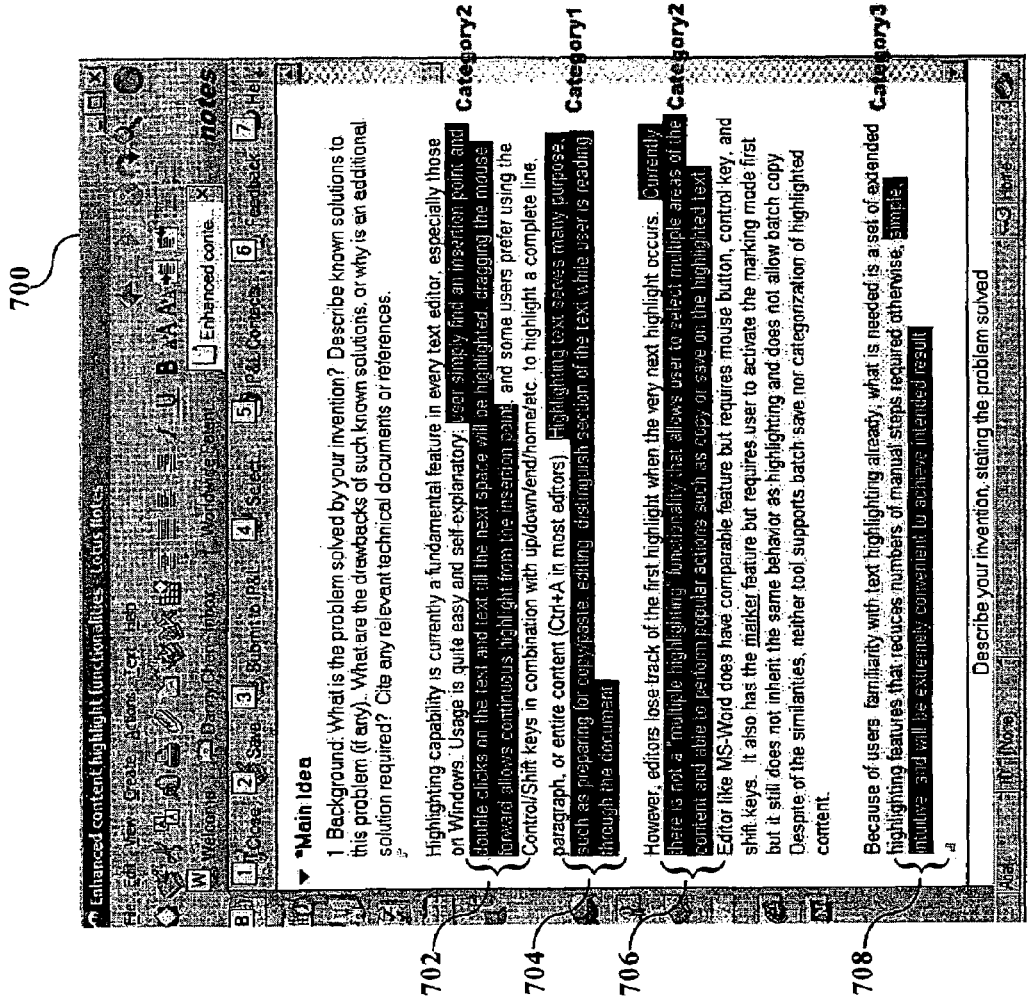
FIGS. 7 and 8 illustrate a preferred embodiment in which selected text can be categorized and manipulated based on the categorization.
Figure 8:
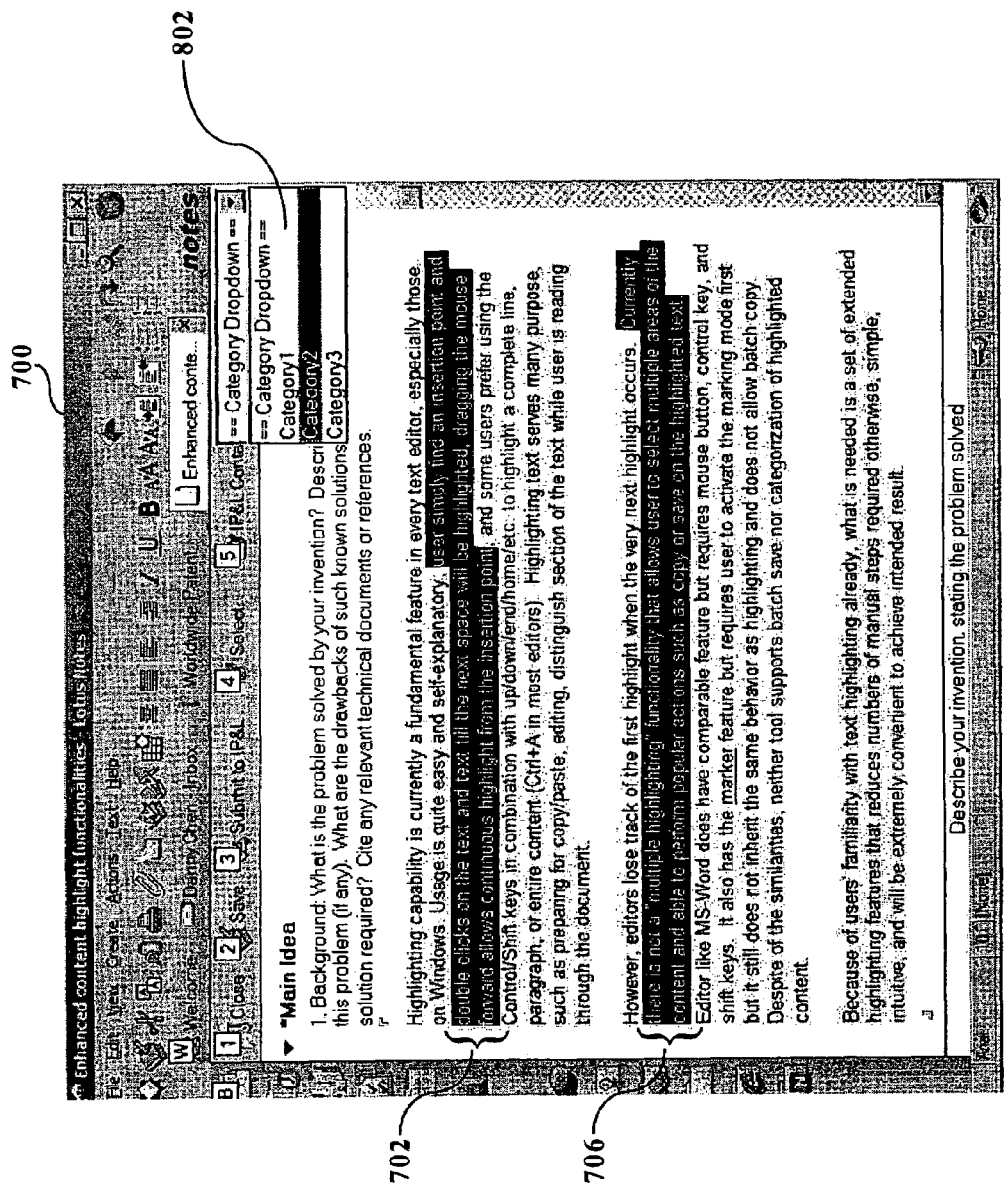

In a preferred embodiment, as text is selected, a category can be declared for the selected text, so that each block of selected text has a category associated therewith. This allows the user to easily group selected text for display, saving or any other desired manipulation. FIGS. 7 and 8 illustrate this capability.

Referring first to FIG. 7, in FIG. 7 a user has selected multiple sections of text 702, 704, 706, and 708 within the same GUI 700, in accordance with the present invention. As text is selected, the user can right-click on the text to display a menu (not shown) of possible categories for the text, and if desired, the category can be listed next to the selected text as shown. As can be seen in FIG. 7, selected text portion 702 has been declared as "Category 2"; selected text portion 704 has been declared as "Category 1"; selected text portion 706 has been declared as "Category 2"; and selected text portion 708 has been declared as "Category 3". Although the process above describes the use of a right-click and drop-down menu, any known method for designating selected text can be used. Further, the various categories available can be predetermined by the software vendor or network administrator, or they can be input and/or selected by the user as part of a set-up process before or during use of the software.

FIG. 8 illustrates a use of the categorized text. As shown in FIG. 8, a category drop-down menu 802 is provided in GUI 700 that allows the user to designate one or more of the categories to be displayed in selected text (in this example, only Category 2 text is shown designated). By designating one of the other categories, the selected text associated with that category will be displayed in selected format within the GUI.

In an alternative embodiment, only the text for the category selected would be visible, i.e., all of the other text could be made to be the same color as the background, rendering it invisible and leaving the selected category of text visible. Further, although the examples show the designated text as being the only selected text displayed, any operations could be performed on the selected text upon designation, e.g., the color could be changed, it could all be saved or sent to a printer, the font could be changed, etc.).

The features illustrated in FIGS. 7 and 8 and described herein provide a simple and easy way for a user to perform multiple-selection functions in a single document or in multiple documents and, without leaving the document, to designate the selected text as being related. This designation can be used later to sort the data according to category, for example. The user may also opt to show only the category 2 text, or the category 3 text, etc.

The present invention provides numerous advantages and features that are unavailable in the prior art. For example, the present invention eliminates multiple manual actions currently required to achieve the same result; it can be incorporated directly in programs or be installed as a plug-in, so that it may work with in a single program or across multiple programs; it introduces category-driven highlighting such that highlighted content can be designated in multiple categories, with the multiple category designations being usable during text manipulation; and it introduces the concept of the intermediate viewer (the "selection viewer" described herein) which allows the user to quickly copy, paste, or just read through the selected text. These beneficial features are described for purpose of example only and it is understood that numerous other benefits will be apparent to designers, programmers, and users of the system.

The above-described steps can be implemented using standard well-known programming techniques, and these techniques are an example of means for performing the functions described herein. The novelty of the above-described embodiment lies not in the specific programming techniques but in the use of the steps described to achieve the described results. Software programming code which embodies the present invention is typically stored in permanent storage of some type, such as permanent storage of a device on which an IM client is running. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for selecting non-contiguous text data in documents displayed on a display device, comprising the steps of:
   clicking a toggle button in a graphical user interface in order enable a multi-portion selection mode;
   designating a first text portion of a first displayed document for selection by highlighting the first text portion, the first highlighting comprising the steps of:
      (a) moving a mouse pointer to the beginning of the first text portion;
      (b) pressing and holding a left mouse button;
      (c) dragging the mouse pointer to the end of the first text portion; and
      (d) releasing the left mouse button;
   without any intervening action, designating a second text portion of a second displayed document for selection by highlighting the second portion, the second highlighting comprising the steps of:
      (a) moving the mouse pointer to the beginning of the second text portion;
      (b) pressing and holding the left mouse button;
      (c) dragging the mouse pointer to the end of the second text portion; and
      (d) releasing the left mouse button;
   saving the first text portion to a clipboard;
   saving the second text portion to the clipboard; and
   without any intervening steps, actuating a direct save mechanism to save the first and second text portions to a single, named file
   wherein:
      the highlighted first text portion and the highlighted second text portion are displayed simultaneously; and
      the first displayed document is in a first software application and the second displayed document is in a second software application different from said first software application.

2. The method of claim 1, further comprising the steps of:
saving the first text portion to a clipboard;
saving the second text portion to the clipboard; and
without any intervening steps, actuating a save mechanism to display the first and second portions in a single selection viewer.

3. The method of claim 2, further comprising the steps of:
obtaining source information regarding the first text portion and saving it to the clipboard;
obtaining source information regarding and second text portion and saving it to the clipboard; and
displaying the source information in said single selection viewer with the displayed first and second text portions.

4. The method of claim 3, further comprising the steps of:
designating the first text portion as belonging to at least one of plural categories;
designating the second text portion as belonging to at least one of said plural categories; and
selectively displaying the first and/or second text portions in said single selection viewer based on the categories to which the first and second categories are designated.

* * * * *